(12) United States Patent
Zak

(10) Patent No.: US 10,377,576 B2
(45) Date of Patent: Aug. 13, 2019

(54) ITEM-SORTING FACILITY COMPRISING A SYSTEM FOR DETECTING AND ANALYSING THE PATH OF THE ITEMS AND SORTING METHOD

(71) Applicant: Fives Intralogistics S.A., Grigny (FR)

(72) Inventor: David Zak, Grigny (FR)

(73) Assignee: Fives Intralogistics S.A., Grigny (FR)

( * ) Notice: Subject to any disclaimer, the term of this patent is extended or adjusted under 35 U.S.C. 154(b) by 0 days.

(21) Appl. No.: 15/781,299

(22) PCT Filed: Dec. 1, 2016

(86) PCT No.: PCT/EP2016/079494
§ 371 (c)(1),
(2) Date: Jun. 4, 2018

(87) PCT Pub. No.: WO2017/093433
PCT Pub. Date: Jun. 8, 2017

(65) Prior Publication Data
US 2018/0319603 A1    Nov. 8, 2018

(30) Foreign Application Priority Data

Dec. 4, 2015 (FR) ..................................... 15 61894

(51) Int. Cl.
*B65G 43/08* (2006.01)
*B65G 17/34* (2006.01)
(Continued)

(52) U.S. Cl.
CPC ........... *B65G 43/08* (2013.01); *B65G 17/345* (2013.01); *B65G 47/34* (2013.01); *B65G 47/42* (2013.01);
(Continued)

(58) Field of Classification Search
CPC ...... B65G 17/345; B65G 43/08; B65G 47/34; B65G 47/42; B65G 47/94; B65G 47/945;
(Continued)

(56) References Cited

U.S. PATENT DOCUMENTS

| 4,915,209 A * | 4/1990 | Canziani ................ B65G 43/08 198/357 |
| 6,820,561 B2 * | 11/2004 | Soldavini ............. B65G 17/345 104/88.03 |

(Continued)

FOREIGN PATENT DOCUMENTS

| EP | 1216938 A1 | 6/2002 |
| FR | 3011537 A1 | 4/2015 |

(Continued)

OTHER PUBLICATIONS

Search Report for French Application No. 1561894 in 3 pages.

*Primary Examiner* — Gene O Crawford
*Assistant Examiner* — Keith R Campbell
(74) *Attorney, Agent, or Firm* — Knobbe, Martens, Olson & Bear, LLP

(57) ABSTRACT

Facility for sorting items comprising: at least one conveyor comprising supports designed to support the items, and at least one receiving device, the supports being designed to eject at least some of the items in succession into or onto the receiving device, the ejected items describing true paths (Tr) with respect to the receiving device, the true paths being liable to belong to a predefined set (Tr-Out) of potential paths considered as being incorrect. The facility further comprises: a detector designed to supply primary information relating respectively to true paths, and an analyzer designed to use the said primary information and to produce at least one secondary information item representative of the belonging of at least one of the true paths to the predefined set (Tr-Out).

11 Claims, 2 Drawing Sheets

(51) Int. Cl.
  *B65G 47/42* (2006.01)
  *B65G 47/34* (2006.01)

(52) U.S. Cl.
  CPC .. *B65G 2201/025* (2013.01); *B65G 2203/025* (2013.01); *B65G 2203/0233* (2013.01); *B65G 2203/0258* (2013.01); *B65G 2203/041* (2013.01); *B65G 2207/40* (2013.01)

(58) Field of Classification Search
  CPC ...... B65G 47/96–965; B65G 2201/025; B65G 2201/0285; B65G 2203/0233; B65G 2203/025; B65G 2203/0258; B65G 2203/041; B65G 2207/40
  See application file for complete search history.

(56) References Cited

U.S. PATENT DOCUMENTS

| | | | |
|---|---|---|---|
| 8,499,920 B2 * | 8/2013 | Ogawa | G06M 7/04 198/358 |
| 9,150,362 B2 * | 10/2015 | Vegh | B65G 43/08 |
| 9,783,370 B2 * | 10/2017 | Fujihara | B07C 3/003 |
| 9,828,187 B2 * | 11/2017 | Chierego | B65G 43/08 |
| 9,857,777 B2 * | 1/2018 | Choi | B65G 17/345 |
| 2014/0083058 A1 | 3/2014 | Issing et al. | |
| 2014/0142746 A1 | 5/2014 | Vegh et al. | |
| 2015/0217334 A1 * | 8/2015 | Kim | B07C 3/02 209/552 |

FOREIGN PATENT DOCUMENTS

| | | |
|---|---|---|
| GB | 2251228 A | 7/1992 |
| JP | 3284898 B2 | 5/2002 |

* cited by examiner

ITEM-SORTING FACILITY COMPRISING A SYSTEM FOR DETECTING AND ANALYSING THE PATH OF THE ITEMS AND SORTING METHOD

CROSS-REFERENCE TO RELATED APPLICATIONS

This application is the U.S. National Phase under 35. U.S.C. § 371 of International Application PCT/EP2016/079494, filed Dec. 1, 2016, which claims priority to French Patent Application No. 15 61894, filed Dec. 4, 2015. The disclosures of the above-described applications are hereby incorporated by reference in their entirety.

FIELD OF THE INVENTION

The invention relates to the field of item-sorting facilities, specifically those provided with cross-belt carriages, tilt-tray carriages, or shoe-sorters.

BACKGROUND OF THE INVENTION

Facilities for sorting items such as parcels and packages are partially made up of systems referred to as sorters. These sorters are, for example, made up of carriages hingedly connected together to form a train that runs in a loop over a path forming a circuit. Generally speaking, the carriages form a chain with regular intervals. These sorting facilities are used especially in the retail industry, for preparing orders intended for points of sale or directly for customers.

The items are inserted by automatic loading stations onto the carriages or possibly onto roller conveyors. These carriages transport the items to outlets corresponding to pick-up areas or shipping areas. The passage of the item from the carriage to the outlet is currently an action that needs to be adjusted manually in order to ensure correct pick-up of the item and to avoid congestion or deterioration of the items during this transfer.

Sorting facilities are used to manage a broad range of items with weights of up to 50 kg and varied shapes or volumes, with carriage movement speeds of up to 3 m/s, Adjust in the ejection of the items is a complex operation.

To better understand the operation, the principle of ejecting a parcel from a sorting facility provided with a cross-belt carriage should be explained, even though the present invention is not limited in the scope of application thereof and allows the same operations in a facility using shoe-sorters or tilt-tray sorters, or any other known item-sorting device.

In order to eject an item from a cross-belt carriage, the cross-belt of the carriage is moved by a motor, which ejects the item perpendicularly or at a substantially acute angle with respect to the direction of travel of the carriage on the rolling belt of the facility. This ejection is initiated by an electronic device, referred to as trigger antenna, arranged facing each outlet.

The location of this device is defined in the study of the facility project and is adapted on site according to the actual position of the outlets. This ejection should make it possible to correctly position the items in the outlets, i.e. to give them a path that is compatible with the shape and the dimensions of the outlet. The outlets are receiving devices, for example roller conveyors, chutes, spiral chutes, baskets, etc.

When changing the type of items, it is sometimes necessary to carry out adjustments, via consecutive tests ejecting more or less large and more or less heavy items, in order to adjust the ejection position. Trigger antennas are commonly used, which transmit trigger orders to the carriage via infrared signals. Instead of these antennas, it is also possible to use the theoretical position expressed in pitch and in time, to indicate to a carriage the output at which the item should be ejected.

Adjustments may be carried out mechanically by moving the antenna for triggering the ejection, or by software, using a trigger offset (software delay at the time of unloading) as a function of the importance of the correction to be made. In order to proceed with the ballistics adjustment, it is convenient to pass items of different types and different characteristics through each of the outlets in order to adjust the trigger offset empirically until the operator or commissioning engineer observes acceptable behaviour. Only experience will allow a correct adjustment, which is based on the operator's sensations. The adjustment is not reproducible and is random from one facility to another.

Moreover, no reliable measurement can be used as a reference for subsequent inspection or for detecting a drift. No real-time diagnosis is possible, and this precludes any automatic error correction or alert. The adjustment of the ballistics of a sorter is thus a long and complex operation, which relies essentially on the experience of the commissioning engineer, since it is manual.

SUMMARY OF THE INVENTION

The present invention thus aims to solve the aforementioned drawbacks, by proposing a sorting facility and a method which make it possible to improve the initial adjustment of the ejection of items and to maintain a correct adjustment subsequently.

Thus, according to a first aspect, the invention relates to an item-sorting facility comprising:
  at least one conveyor forming a circulation path for the items, the conveyor including supports designed to support the items, and
  at least one receiving device, the supports also being designed to eject at least some of the items, in series, into or onto the receiving device, the ejected items describing actual paths with respect to the receiving device, the actual paths being capable of belonging to a predefined set of potential paths considered to be incorrect, also comprising:
  a detector designed to provide primary information relative to the actual paths, respectively, and
  an analyser designed to use said primary information and to produce at least one piece of secondary information showing that at least one of the actual paths belongs to the predefined set.

According to certain embodiments, the facility also comprises one or more of the following features, taken alone or in any technically possible combination:
  the detector comprises at least one device taken among a camera, an infrared sensor, an ultrasound sensor, and a laser, or a combination of these devices;
  the primary information consists of images or videos, and the analyser comprises a calculation means or a computer designed to analyse said images or said videos, the secondary information being a result of the analysis;
  the facility also comprises a control system designed to receive the secondary information and to modify at least one operating parameter of the conveyor using the secondary information, the actual paths being modified after said modification of the parameter so as to no longer belong to the predefined set;

the operating parameter of the conveyor designed to modify:
an ejection speed of at least one of the items with respect to the receiving device,
a time for triggering the ejection of at least one of the items,
a time lapse between said triggering time and a time reference, or
a speed of movement of at least one of the supports with respect to the receiving device; and
the facility comprises a sensor designed to provide said time reference, or the control system is designed to provide said time reference.

According to a second aspect, the invention also relates to a sorting method comprising the following steps:
providing at least one conveyor forming circulation path for the items, the conveyor including supports designed to support the items,
providing at least one receiving device,
electing at least some of the items in series via the supports into or onto the receiving device, the ejected items describing actual paths with respect to the receiving device,
providing a predefined set of potential paths considered to be incorrect, the actual paths being capable of belonging to the predefined set,
detecting in order to provide primary information relating to the actual paths, respectively, and
analysing the actual paths from the primary information and obtaining secondary information showing that at least one of the actual paths belongs to the predefined set, According to certain embodiments, the method also comprises one or more of the following features, taken alone or in any technically possible combination:
the step of providing the predefined set comprises the following sub-steps:
storing one of the actual paths, the stored path being considered to be correct, and
calculating the predefined set from the stored path and a tolerance threshold representing a maximum deviation between the actual paths and the stored path;
the step of providing the predefined set comprises the use of a graphic interface by an operator;
the method also comprises a step of modifying at least one operating parameter of the conveyor as a function of the secondary information, the actual paths being modified after said modification of the parameter so as to no longer belong to the predefined set; and
in the step of modifying at least one operating parameter of the conveyor, at least one physical characteristic of at least one of the items is used to modify said operating parameter.

BRIEF DESCRIPTION OF THE DRAWINGS

The characteristics and advantages of the invention will appear upon reading the following description, given only by way of a non-restrictive example while referring to the appended drawings, wherein.

DETAILED DESCRIPTION OF THE PREFERRED EMBODIMENTS

Figure 1:
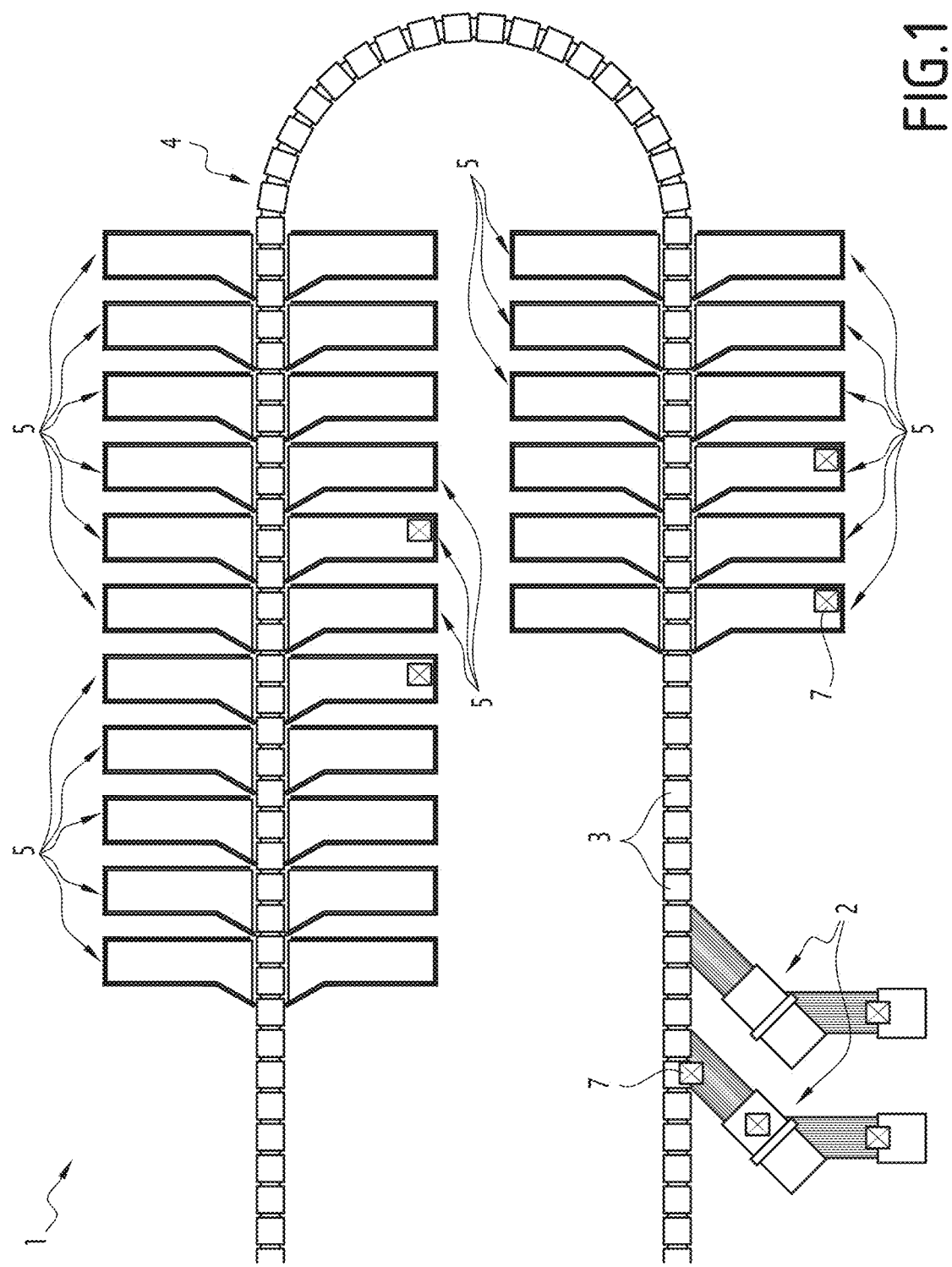
FIG. 1 is a diagrammatic representation, viewed from above, of a facility according to the invention.

In reference to FIG. 1, a facility 1 for sorting items 7 is described. The facility 1 is, for example, a cross-belt sorter.

Alternatively, the facility 1 is, for example, a tilt-tray sorter or shoe-sorter.

The facility 1 comprises a conveyor 4, automatic loading stations 2 for transferring the items 7 onto the conveyor, and receiving devices 5 for collecting sorted items 7 as a function of destinations that corresponding with the receiving devices, respectively.

The items 7 are, for example, parcels, trays, objects that are packaged or not, letters or packages, plastic trays, tyres, flat objects, bundles, letters, or manufactured products in their packaging.

The conveyor 4 forms a track along which the items 7 circulate before passing into one of the receiving devices 5, respectively. In the example shown, the conveyor 4 is U-shaped when viewed from above. The conveyor 4 includes consecutive supports 3 designed to support the items 7, advantageously spaced apart regularly along the circulation path. The conveyor 4 is, for example, a cross-belt conveyor. The circulation path locally defines a longitudinal direction L and a circulation direction.

The supports 3 form a chain which moves over the circulation path formed by the conveyor 4. The supports 3 are, for example, carriages. Each carriage has a cross-belt 10, so called because it is oriented in a transverse direction T.

The supports 3 are designed to eject the items 7 sidewise with respect to the conveyor onto one of the receiving devices 5. Each ejected item 7 describes an actual path Tr with respect to the receiving device 5 onto which it is ejected. The actual paths Tr belong either to a predefined set Tr-In of potential paths considered to be correct or acceptable, or to a predefined set Tr-Out of potential paths considered to be incorrect or unacceptable.

The paths are considered to be correct or incorrect since it is sought, for example, to avoid hazardous impacts to the items due to the contents thereof, or else to avoid a build-up of items 7 at the intake or on the receiving devices 5. Generally speaking, a "correct" path is a path which allows unobstructed transport of the item 7 via the receiving device 5.

In the shown example, the transverse direction T forms a right angle with the longitudinal direction. In an alternative (not shown), the transverse direction T forms an acute angle with the longitudinal direction L.

The facility 1 also comprises a detector 61 designed to provide primary information relating to the real paths Tr of the items 7, respectively, and an analyser 6 designed to use said primary information and to produce at least one piece of secondary information showing that at least one of the actual paths Tr belongs to the predefined set Tr-Out.

The facility 1 comprises a control system 8 designed to receive the secondary information and to modify at least one operating parameter of the conveyor 4, The actual paths Tr are modified after modifying the parameter so as to no longer belong to the predefined set Tr-Out, i.e. in order to become acceptable once again.

"Modifying" an operating parameter is understood here two mean calculating a new value for said parameter, the new value being imposed on the conveyor 4 by the control system 8, for example in the form of a new setpoint.

The operating parameter can represent, for example:
an ejection speed of at least one of the items 7 with respect to the receiving device 5,
an acceleration to be applied to at least one of the items 7 by the motor of the system 10,
a time for triggering the ejection of at least one of the items 7, time lapse, or offset, between said triggering time and a time reference, and/or a speed of movement of the support 3 with respect to the receiving device 5.

Figure 2:
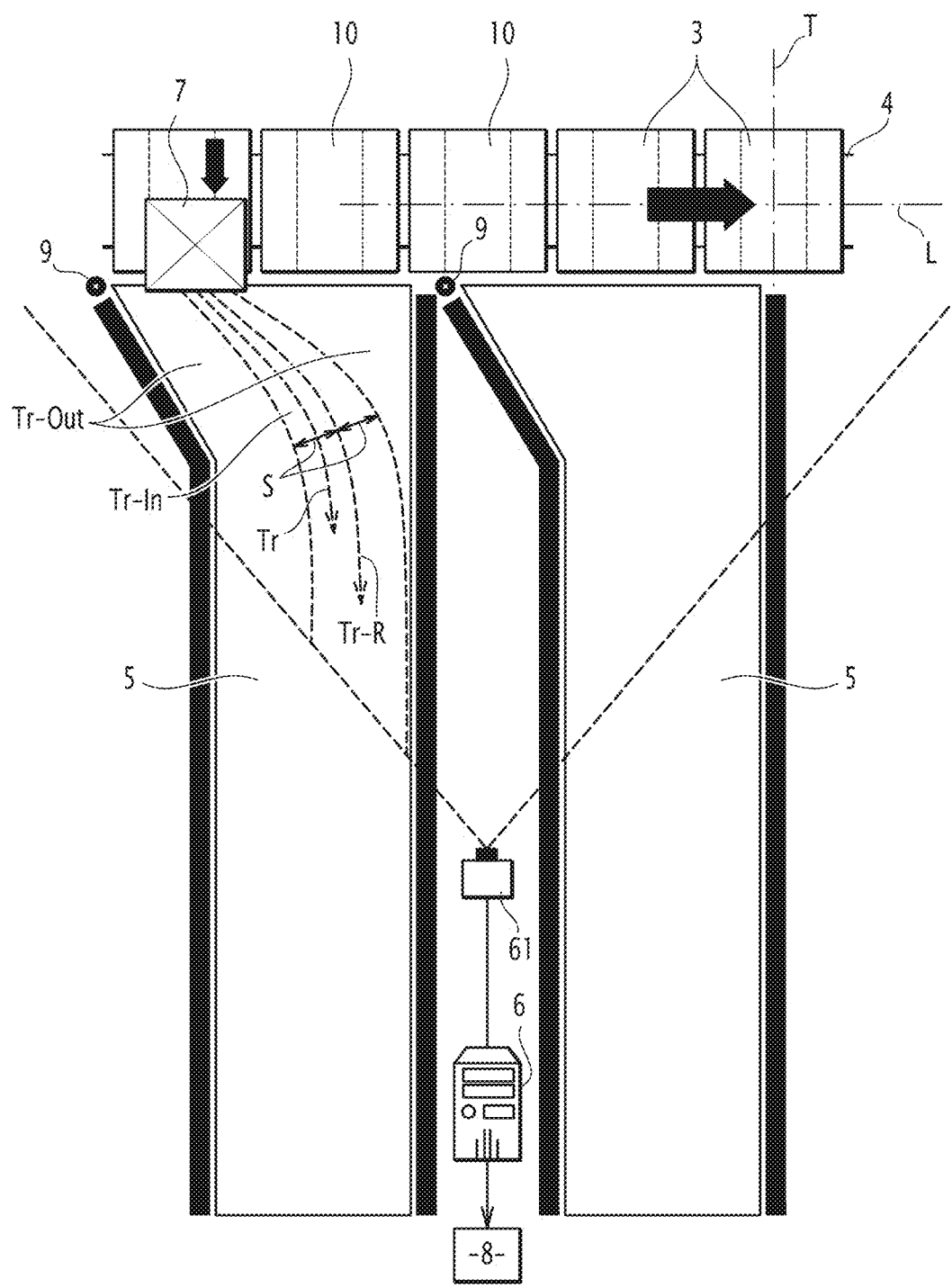
FIG. 2 is a top view of a portion of the facility shown in FIG. 1, showing in particular two receiving devices.

FIG. 2 shows two receiving devices 5, which will also be referred to as "outlets", in reference to the conveyor 4. The conveyor 4 passes in front of the outlets 5. The outlets 5 are provided with trigger antennas 9 arranged at the intake of each outlet 5, on the upstream side in the circulation direction of the conveyor 4. The outlets 5 also include, for example, a ramp extending transversely from the conveyor 4, over which the items 7 slide.

When an item 7, transported by a support 3, arrives at the trigger antenna 9, a motor (not shown) of the cross-belt of the support turns the cross-belt to eject the item 7 into the destination outlet 5 thereof.

The antenna 9 in this case provides said time reference for triggering the ejection.

According to one variant, the control system 8 is designed to provide said time reference.

The detector 61 makes it possible to observe the actual path Tr of the item 7 on the outlet 5. The detector 61 is, for example, a camera, and the primary information is an image, a plurality of images, or a video.

Alternatively, the detector 61 is any other sensor also designed to locate the item 7 with respect to the receiving device 5 used, and in any case sufficient for determining whether the actual path Tr belongs to the predefined set Tr-In or to the predefined set Tr-Out. The detector 61 is, for example, an infrared sensor, a laser or a combination of these sensors. The detector 61 comprises, for example, a plurality of sensors of the same type, operating for example in series or by triangulation.

The detector 61—in the example a camera—is, for example, placed longitudinally between two consecutive receiving devices 5, so that the detector is capable of providing information relative to the actual paths on the two receiving devices 5 which are adjacent thereto. The use of a video camera particularly advantageous for viewing the actual paths Tr of the items 7 on the outlets 5.

The analyser 6 advantageously comprises a calculation means which aims to determine the actual path Tr and, for example, a speed V of the item 7 with respect to the outlet 5 taken, especially at the time of ejection. This calculation means is, for example, a computer provided with adequate software, a PLC, or an electronic card for determining the paths and speeds of the items 7.

The detector 61 or the analyser 6 can also store images or videos of the items 7 that pass over the outlets 5. These files can be examined subsequently in order to understand the behaviour of certain items 7 and the actual path Tr thereof.

The analyser 6 analyses the primary information and produces at least one piece of secondary information showing whether the actual path Tr belongs to the predefined set Tr-In or to the predefined set Tr-Out.

The predefined set Tr-In and the predefined set Tr-Out are, for example, defined by the operator directly in the analyser 6. This definition can be carried out as a function of technical parameters of the outlets 5 and average characteristics of the items 7, or comes from an iterative parametrisation process carried out by an operator (not shown) using the analyser 6.

The operator can, in particular, store a reference actual path Tr-R of an item 7 which is considered to be acceptable, and generalise this reference actual path by adding a tolerance threshold S to same. The predefined set Tr-In is then defined as all the potential paths having a deviation that is lower than or equal to the tolerance threshold with the reference actual path Tr-R. The predefined set Tr-Out contains the potential paths which have a deviation strictly higher than the tolerance threshold S.

According to one variant, the operator can also indicate to the analyser 6 areas to be avoided on the outlets 5 by means of a graphic interface of the analyser 6 showing the outlets 5. In this case, the operator selects the potential paths that belong to the predefined set Tr-In and/or the potential paths that belong to the predefined set Tr-Out.

Once the predefined set Tr-In and the predefined set Tr-Out have been defined for each outlet 5 or by type of outlets 5, items 7 of different sizes are advantageously inserted into the facility 1 in order to test and adjust the triggering offsets with respect to the antennas 9.

This task is normally carried out by an experienced commissioning engineer, who conducts consecutive tests. Advantageously, the invention makes it possible to adjust the offset for triggering the ejection of the items 7 automatically or manually as a function of information supplied by the analyser 6.

If the actual path Tr of one of the items 7 in one of the outlets 5 is outside the predefined set Tr-In, the analyser 6 transmits this information to the control system 8 of the facility 1 in order for an adjustment to be made to bring the actual path Tr of the subsequent items 7 into the predefined set Tr-In. This adjustment is carried out by an operator, or automatically by the control system 8. The facility 1 according to the invention can thus change its operation in a closed loop in order to dynamically correct the ballistics observed during the ejection of the items 7.

According to a physical parameter, such as the size or the weight of the items 7 in question, the actual path Tr can vary. The actual path Tr can be anticipated as a function of the size or weight of the item 7. Advantageously, the predefined set Tr-In is defined as a function of the average size of the items 7 or the size of the item 7 in question. The individual weight of each item 7, measured optionally at the loading stations 2 of the facility 1, can be used to analyse the path and also makes it possible to optimise the ballistics via statistical analysis. The various actual path Tr diagrams as a function of the weight and the size of the items 7 can thus be configured so that the adjustments for ejecting the items 7 take them into account.

If a drift of the actual path Tr, defined for example as the crossing of a threshold in the number of items 7 outside the predefined set Tr-In, is detected by the detector 61 and the analyser 6, the control system 8 makes it possible, for example:

- automatically to compensate for said drift by automatically adjusting the offset, while notifying the operator of this drift,
- automatically to make request for intervention if the process for adjusting the offset is not sufficient for returning to a normal situation,
- dynamically to adapt the behaviour of the facility 1 as a function of production. Thus, the facility 1 becomes more versatile, since it allows a certain latitude in its use without requiring any serious, complex intervention (for example, in mass distribution, with morning shifts including small, light parcels and evening shifts with large, heavy parcels, which have very different dynamic behaviour),
- to detect abnormal behaviour of the facility 1 or simply of an item 7 that is difficult to mechanise (rolling item) and to launch alerts or corrective actions in order to achieve optimum operation, automatically to correct the ejection triggering offset in order to take into account a malfunction, in particular the wear of a cross-belt or the wear of a cross-belt motor. The performance of the facility 1 is thus maintained even in the case of an incident or wear. Beyond a certain threshold of items 7 with actual paths that belong to the predefined set Tr-Out, the faulty outlet 5 or substrate 3 are, for example, deactivated, since they are not operational, and an alert is emitted in order to trigger a maintenance operation. Backup outlets (wider, greater tolerance) are advantageously provided in this case in order to receive the items 7 intended for the faulty outlet 5, and/or to raise an alert in order to indicate to the operator that a correction was able to be made automatically by the control system 8, or that a maintenance operation is necessary because no automatic correction could be made.

According to another example of an embodiment of the invention, the facility 1 uses digital trigger antennas which make is possible to send various acceleration setpoints to the supports 3 dynamically, in addition to the ejection setpoints. This makes it possible, after analysing the actual paths Tr, to correct the ballistics with even greater accuracy. Indeed, it is then possible to adjust the trigger offset and to adjust the ejection speed and/or the acceleration of the item 7 by the support 3 in order to obtain an actual path Tr that is comprised in the predefined set Tr-In.

It is also possible to vary the speed of the support 3 with respect to the outlet 5 in order to obtain a speed that is compatible with an item 7 that is especially complicated to eject, for example a very heavy item whose inertia would necessary involve an incorrect outlet path. For example, a reduction of this speed generally facilitates a correct ejection.

The present invention also allows for very easy adaptation to a reduction in the operating speed of the facility 1. In order to limit the energy consumption of the facility 1 during said reduction in operating speed, the operator can reduce the speed of travel of the supports 3 on the circulation path. This speed reduction is currently very complicated to manage, since it affects all the trigger offsets that need to be adjusted. The invention makes it possible to carry out this adjustment automatically by analysing new actual paths Tr and by adjusting the offsets for triggering the ejection.

In order to guarantee correct monitoring of the outlets 5 by the analyser 6, the number of detectors 61 is adjusted according to the number of outlets 5 to be monitored. Nevertheless, certain technologies allow the detectors 61 to monitor a plurality of outlets 5 at once. This is the case of video cameras that have wide angles of action, as shown in FIG. 2. Another advantage of using a camera as a detector is that it allows for reliable detection of false destinations. Indeed, the analyser 6 can track an item 7 in order to ensure that it actually reaches its destination by passing through the intended outlet 5.

What is claimed is:

1. A facility for sorting items comprising:
at least one conveyor forming a circulation path for the items, the conveyor including supports designed to support the items,
at least one receiving device, the supports also being designed to eject at least some of the items in series into or onto the receiving device, the ejected items describing actual paths (Tr) with respect to the receiving device, the actual paths (Tr) being capable of belonging to a predefined set (Tr-Out) of potential paths considered to be incorrect,
a detector designed to provide primary information relative to the actual paths (Tr), respectively, and
an analyser designed to use said primary information and to produce at least one piece of secondary information showing that at least one of the actual paths (Tr) belongs to the predefined set (Tr-Out).

2. The facility according to claim 1, wherein the detector comprises at least one device taken among a camera, an infrared sensor, an ultrasound sensor, and a laser, or a combination of these devices.

3. The facility according to claim 1, wherein:
the primary information is images or videos, and
the analyser comprises a calculation means or a computer designed to analyse said images or said videos, the secondary information being a result of the analysis.

4. The facility according to claim 1, further comprising a control system designed to receive the secondary information and to modify at least one operating parameter of the conveyor by using the secondary information, the actual paths (Tr) being modified after said modification of the parameter so as to no longer belong to the predefined set (Tr-Out).

5. The facility according to claim 4, wherein the operating parameter of the conveyor is designed to modify:
an ejection speed of at least one of the items with respect to the receiving device,
a time for triggering the ejection of at least one of the items,
a time lapse between said triggering time and a time reference, or
a speed of movement of at least one of the supports with respect to the receiving device.

6. The facility according to claim 5, wherein:
it comprises a sensor designed to provide said time reference or
the control system is designed to provide said time reference.

7. A method for sorting items comprising the following steps:
providing at least one conveyor forming a circulation path for the items, the conveyor including supports designed to support the items,
providing at least one receiving device,
ejecting at least some of the items in series via the supports into or onto the receiving device, the ejected items describing actual paths (Tr) with respect to the receiving device,
providing a predefined set (Tr-Out) of potential paths considered to be incorrect, the actual paths (Tr) being capable of belonging to the predefined set (Tr-Out),
detecting in order to provide primary information relating to the actual paths (Tr), respectively, and
analysing the actual paths (Tr) from the primary information and obtaining secondary information showing that at least one of the actual paths (Tr) belongs to the predefined set (Tr-Out).

8. The method according to claim 7, wherein the step of providing the predefined set (Tr-Out) comprises the following sub-steps:
storing one of the actual paths (Tr), the stored path being considered to be correct, and calculating the predefined set (Tr-Out) from the stored path and a tolerance threshold representing a maximum deviation between the actual paths (Tr) and the stored path.

9. The method according to claim 7, wherein the step of providing the predefined set (Tr-Out) comprises the use of a graphic interface by an operator.

10. The method according to claim 7, also comprising a step of modifying at least one operating parameter of the conveyor as a function of the secondary information, the actual paths (Tr) being modified after said modification of the parameter so as to no longer belong to the predefined set (Tr-Out).

11. The method according to claim 10, wherein, in the step of modifying at least one operating parameter of the conveyor, at least one physical characteristic of at least one of the items is used to modify said operating parameter.

* * * * *